United States Patent
Nilsson et al.

(10) Patent No.: US 10,011,300 B2
(45) Date of Patent: Jul. 3, 2018

(54) LANE CHANGE CONTROL ARRANGEMENT, A VEHICLE COMPRISING SUCH ARRANGEMENT AND A METHOD FOR CONTROLLING LANE CHANGES

(71) Applicant: VOLVO CAR CORPORATION, Gothenburg (SE)

(72) Inventors: Julia Nilsson, Gothenburg (SE); Mohammad Ali, Angered (SE); Mattias Erik Brannstrom, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 15/168,564

(22) Filed: May 31, 2016

(65) Prior Publication Data
US 2017/0015354 A1 Jan. 19, 2017

(30) Foreign Application Priority Data
Jul. 13, 2015 (EP) .................................... 15176443

(51) Int. Cl.
| | | |
|---|---|---|
| B62D 15/02 | (2006.01) |
| B60W 30/16 | (2012.01) |
| B60W 10/04 | (2006.01) |
| B60W 10/20 | (2006.01) |
| G08G 1/16 | (2006.01) |

(52) U.S. Cl.
CPC ......... B62D 15/0255 (2013.01); B60W 10/04 (2013.01); B60W 10/20 (2013.01); B60W 30/16 (2013.01); G08G 1/167 (2013.01)

(58) Field of Classification Search
CPC ... B62D 15/0255; B60W 10/04; B60W 30/16; B60W 10/20; G08G 1/167
See application file for complete search history.

(56) References Cited

U.S. PATENT DOCUMENTS

| | | | | |
|---|---|---|---|---|
| 5,521,579 A | * | 5/1996 | Bernhard | ........... B60K 31/0008 180/167 |
| 2014/0214255 A1 | * | 7/2014 | Dolgov | ................ G05D 1/0248 701/23 |
| 2015/0269844 A1 | * | 9/2015 | Arndt | ..................... G08G 1/167 340/435 |

FOREIGN PATENT DOCUMENTS

| | | |
|---|---|---|
| EP | 2492165 | 10/2013 |
| WO | 03080390 | 10/2003 |
| WO | 2012172591 | 12/2012 |

OTHER PUBLICATIONS

Extended European Search Report for European Application No. EP 15176443.8, Completed by the European Patent Office, dated Jan. 29, 2016, 6 Pages.

\* cited by examiner

*Primary Examiner* — Anne M Antonucci
(74) *Attorney, Agent, or Firm* — Brooks Kushman P.C.

(57) ABSTRACT

A lane change control arrangement, vehicle, and method are described. The lane change control arrangement is arranged to adjust a host vehicle velocity in accordance with a first velocity profile to expand a detectable zone to cover a previously undetectable zone of a second road lane, detect whether a vehicle is present in the previously undetectable zone, determine that a lane change is possible, or determine that a lane change is unsuitable using the second road lane and issue a control signal to the vehicle drive arrangement to adjust the host vehicle velocity until a safety distance is established between the host vehicle and the detected vehicle, and issue a control signal to the vehicle drive arrangement to perform the lane change.

11 Claims, 2 Drawing Sheets

LANE CHANGE CONTROL ARRANGEMENT, A VEHICLE COMPRISING SUCH ARRANGEMENT AND A METHOD FOR CONTROLLING LANE CHANGES

CROSS-REFERENCE TO RELATED APPLICATIONS

This application claims foreign priority benefits under 35 U.S.C. § 119(a)-(d) to European patent application number EP 15176443.8, filed Jul. 13, 2015, which is incorporated by reference in its entirety.

TECHNICAL FIELD

Embodiments herein relate to a lane change control arrangement. Embodiments herein further relate to a vehicle comprising a lane change control arrangement and to a method for controlling lane changes.

BACKGROUND

In various traffic situations vehicles need to change from one road lane to another road lane. For example, different lanes may lead to different destinations, and therefore a vehicle may have to change lane in order to arrive at a desired destination. In some scenarios a road comprises a plurality of road lanes. A vehicle may then have to change between lanes e.g. in order to keep a selected driving velocity.

Some vehicles today are equipped with autonomous and/or at least partly automatic drive systems. Such systems generally aim at increasing comfort and/or safety for vehicle occupants. Some systems are also arranged to increase safety for persons in the vehicle surrounding. An example of such system is an adaptive cruise control system, ACC. Such system can keep a selected host vehicle velocity. If the host vehicle approaches a preceding vehicle driving in the same lane the ACC may adjust the selected velocity such that the host vehicle keeps a safety distance to the preceding vehicle.

On roads with multiple lanes vehicles may be positioned relatively each other such that at least one of the vehicles drives in a blind spot of another vehicle. A blind spot is a zone or section of a host vehicle surrounding in which a vehicle operator and/or vehicle sensors have difficulties to detect objects near the host vehicle.

Since the vehicle operator and/or vehicle sensors may be unable to detect nearby objects, such as a vehicle driving in an adjacent lane, a risk for collision may be enhanced.

The system described in EP2492165B1 aims at decreasing a risk that a vehicle drives in a blind spot of another vehicle when a host vehicle catches up a preceding vehicle. A detecting unit of the host vehicle can detect if a surrounding vehicle is in a blind spot. If such situation occurs the velocity of the host vehicle is changed such that none of the vehicles stays in the blind spot of the other vehicle.

The system in EP2492165B1 may function well in some specific scenarios but there remains a need for an arrangement which efficiently can improve traffic safety in potential lane changing situations.

SUMMARY

Embodiments herein aim to provide a lane change control arrangement which efficiently improves traffic safety in potential lane changing situations.

According to an embodiment, this is provided by a lane change control arrangement, arranged to control lane changes for a host vehicle where the host vehicle drives in a first road lane of a road having two or more lanes and where the host vehicle comprises at least one remote sensor arranged to determine whether a vehicle is present in a detectable zone of a second road lane adjacent to the first road lane, and a vehicle drive arrangement arranged to control at least one of steering and velocity of the host vehicle, wherein the lane change control arrangement is arranged to adjust, via the vehicle drive arrangement, the host vehicle velocity in accordance with a first velocity profile to expand the detectable zone to cover a previously undetectable zone of the second road lane, detect, via the at least one sensor, whether a vehicle is present in the previously undetectable zone, determine that a lane change is possible using the second road lane upon having detected that no vehicle is present in the previously undetectable zone, or unsuitable using the second road lane upon having detected that a vehicle is present in the previously undetectable zone and issuing a control signal to the vehicle drive arrangement to adjust the host vehicle velocity in accordance with a second velocity profile until a safety distance is established between the host vehicle and the detected vehicle, issue a control signal to the vehicle drive arrangement to perform the lane change.

Since the lane change control arrangement is arranged to adjust the host vehicle velocity in accordance with a first velocity profile, detect whether a vehicle is present in the previously undetectable zone, determine whether a lane change is possible or unsuitable and issue a control signal to the vehicle drive arrangement to perform the lane change, safety is enhanced.

The first velocity profile can e.g. include one or more accelerations and/or decelerations, and can be selected such that it is very unlikely that a vehicle within the undetectable zone of the second road lane will continue to stay within the undetectable zone when the host vehicle follows the first velocity profile.

Thus, the lane change control arrangement reduces or avoids risks associated with lane changes in situations where a surrounding vehicle or other road user is present in the undetectable zone of the second road lane. Hereby no additional sensors have to be arranged to cover the undetectable zones.

The first and second road lanes are arbitrary. The first road lane can be a road lane which is a right lane, a left lane or a middle lane. Also the second road lane can be a road lane which is a right lane, a left lane or a middle lane. The safety distance can be a predefined safety distance or can be set in dependence on the traffic situation for the host vehicle. It can then be dependent on host vehicle and/or surrounding vehicle velocities. In some embodiment also a velocity and/or heading of the surrounding vehicle is determined.

Thus, hereby is provided a lane change control arrangement, which efficiently improves traffic safety in potential lane changing situations.

According to some embodiments the lane change control arrangement is arranged to simulate that a fictive vehicle drives with a fictive vehicle velocity in the undetectable zone of the second road lane and select the first velocity profile in dependence of the fictive vehicle velocity. Simulation of a fictive vehicle which drives with a fictive vehicle velocity in the undetectable zone of the second road lane and selection of the first velocity profile in dependence of the fictive vehicle velocity is an efficient and safe way of performing lane changes. The simulation can also be referred to as an assumption or presumption. Thus, it is simulated or assumed that a fictive vehicle is driving in the undetectable zone. The first velocity profile is selected such that a distance between the host vehicle and the fictive vehicle should be changed when the host vehicle starts to follow the first velocity profile. It can then be detected whether a vehicle actually was driving in the undetectable zone or not.

The fictive vehicle velocity may be a constant velocity or a velocity which varies over time. The lane change control arrangement can also, for the simulation, take into account that a surrounding vehicle in front of the fictive vehicle is detected. If the surrounding vehicle in front of the fictive vehicle drives with a certain velocity it can be simulated that the fictive vehicle has approximately the same velocity, for example in a situation where the fictive vehicle is equipped with an adaptive cruise control. It may in other words be assumed that the fictive vehicle follows the detected vehicle and has a safety distance to the detected vehicle.

According to some embodiments the lane change control arrangement is arranged to issue a control signal to the vehicle drive arrangement to perform the lane change from the first lane to a position ahead or behind a detected vehicle in the previously undetectable zone where such is detected. Hereby the host vehicle practically can perform the lane change in a safe and efficient manner also when a vehicle in the second road lane is detected.

According to some embodiments the lane change control arrangement is arranged to select and retrieve the first velocity profile among a plurality of saved velocity profiles, and where the selection is based on the host vehicle velocity. Hereby the first velocity profile can be accessed in a fast and reliable manner. According to some embodiments the lane change control arrangement is arranged to select and retrieve the second velocity profile among a plurality of saved velocity profiles, and where the selection is based on the host vehicle velocity or a, by the at least one remote sensor, detected vehicle velocity of a vehicle in the second road lane. The first velocity profile can alternatively be calculated or estimated online or on-board, for example based on information on one or more surrounding vehicles. If positions and/or velocities for any detected vehicles are known, the information can be used for an estimation or assumption on likely positions and/or velocities for non-detected vehicles in the host vehicle surrounding. In some embodiments communication equipment of the host vehicle may be used for the retrieving information saved on servers and/or databases.

According to some embodiments the lane change control arrangement is arranged to generate the first velocity profile, where the generation is based on the host vehicle velocity or a, by the at least one remote sensor, detected vehicle velocity of a vehicle in the second road lane. Hereby the first velocity profile can be generated such that it is very unlikely that a vehicle driving in the undetectable zone of the second road lane drives with a velocity that matches the first velocity profile. In some embodiments also a current road speed limit is taken into account for the generation.

According to some embodiments the first velocity profile comprises: ramping up the host vehicle velocity over a time duration of at least one second. According to some embodiments the first velocity profile comprises: ramping down the host vehicle velocity over a time duration of at least one second. According to some embodiments the first velocity profile comprises: alternately ramping up and down the host vehicle velocity over a time duration of at least one second. In some embodiments the time duration is longer, such as about 2-10 seconds. The time duration can be selected depending on traffic situation, velocity of the host vehicle or detected vehicles or similar.

Embodiments herein also aim to provide a vehicle comprising a lane change control arrangement which efficiently improves traffic safety in potential lane changing situations.

According to an embodiment, this is provided by a vehicle which comprises a lane change control arrangement according to embodiments herein.

Embodiments herein also aim to provide a method for controlling lane changes which efficiently improves traffic safety in potential lane changing situations.

According to an embodiment, this is provided by a method for controlling lane changes of a host vehicle which comprises a lane change control arrangement arranged to control lane changes for the host vehicle where the host vehicle drives in a first road lane of a road having two or more lanes and where the host vehicle comprises; at least one remote sensor, arranged to determine whether a vehicle is present in a detectable zone of a second road lane adjacent to the first road lane and a vehicle drive arrangement, arranged to control at least one of steering and velocity of the host vehicle, wherein the method comprises:

adjusting, via the vehicle drive arrangement, the host vehicle velocity in accordance with a first velocity profile to expand the detectable zone to cover a previously undetectable zone of the second road lane, detecting, via the at least one sensor, whether a vehicle is present in the previously undetectable zone, determining that a lane change is possible using the second road lane upon having detected that no vehicle is present in the previously undetectable zone, or unsuitable using the second road lane upon having detected that a vehicle is present in the previously undetectable zone and issuing a control signal to the vehicle drive arrangement to adjust the host vehicle velocity in accordance with a second velocity profile until a safety distance is established between the host vehicle and the detected vehicle, issuing a control signal to the vehicle drive arrangement to perform the lane change.

BRIEF DESCRIPTION OF THE DRAWINGS

The various embodiments disclosed herein, including its particular features and advantages, will be readily understood from the following detailed description and the accompanying drawings, in which.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Embodiments herein will now be described more fully with reference to the accompanying drawings, in which some embodiments are shown. Like numbers refer to like elements throughout. Well-known functions or constructions will not necessarily be described in detail for brevity and/or clarity.

Figure 1:
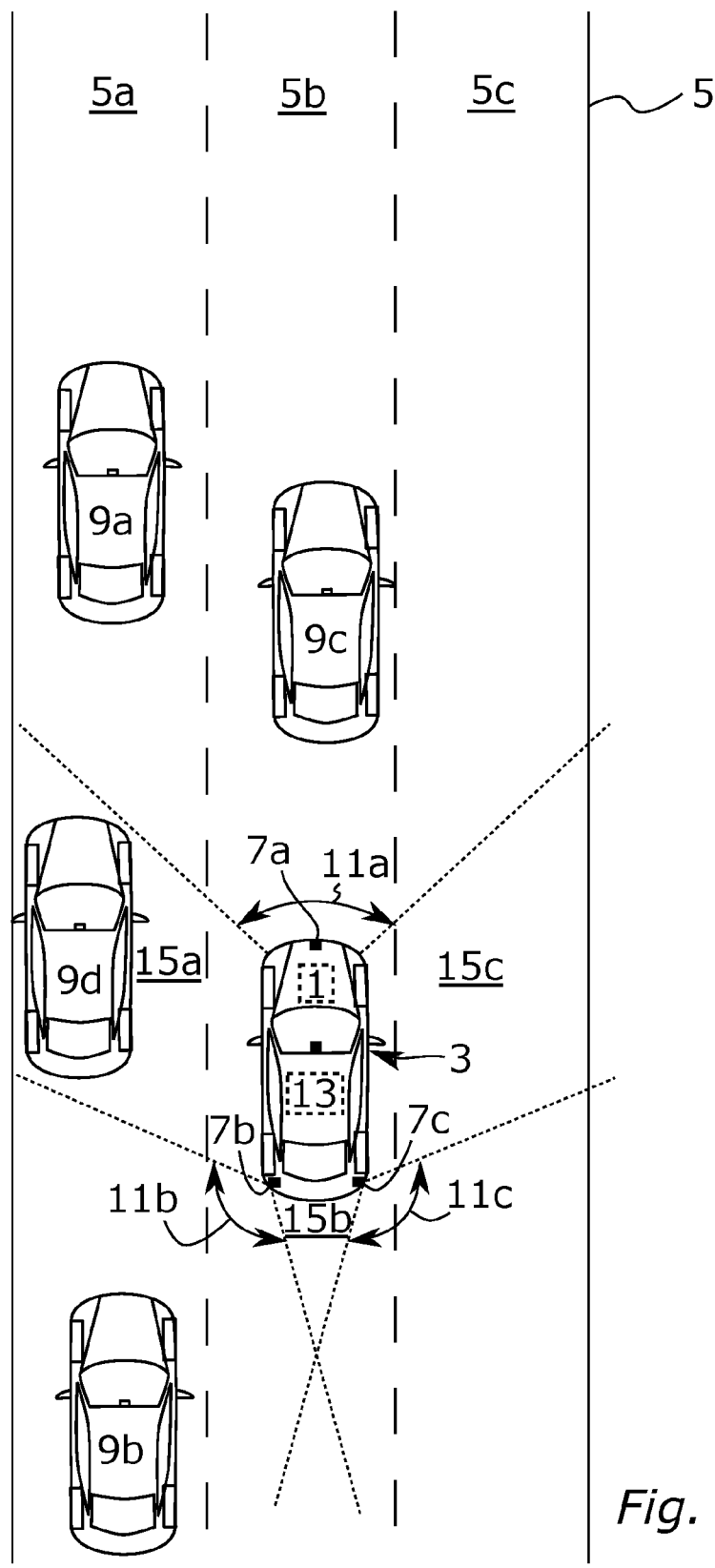
FIG. 1 illustrates a host vehicle with a lane change control arrangement according to some embodiments.

FIG. 1 illustrates a lane change control arrangement 1 for a host vehicle 3. The lane change control arrangement 1 is arranged to control lane changes for the host vehicle 3 where the host vehicle 3 drives on a first road lane 5b of a road 5 having two or more lanes 5a, 5b, 5c.

The host vehicle 3 comprises at least one remote sensor 7. The at least one remote sensor 7 can detect object, such as surrounding vehicles or other road users, obstacles and road signs etc. in the vicinity of the road 5. "Remote" indicates that the at least one sensor 7 is capable of indirect detection, i.e. without being in contact with the detected object.

The sensor or sensors 7 of the host vehicle 3 can be any type of sensor, such as one or more camera sensors, one or more radar sensors and/or one or more lidar-sensors.

A camera sensor may be e.g. a front-, side- or rear facing digital camera equipped with or connected to one or more processors with object recognition logics. Hereby surrounding objects, such the road lanes 5a, 5b, 5c, other vehicles, traffic signs, pedestrians, animals, different obstacles etc. may be detected and in some cases, identified/classified. Radar sensors include transmitters that emit signals that bounce back from objects around the host vehicle 3, and receivers that receive the returned signals. The radar sensors may include e.g. ultra-wide band radars, narrow band radars and/or multi node radars. Lidar-sensors may measure distances to objects through illuminating the objects with a laser and analyzing the reflected light. Other types of sensors used to monitor the host vehicle surrounding may be e.g. ultrasonic sensors and/or infrared sensors. The host vehicle 3 can also comprise communication equipment such that the host vehicle 3 is able to send and receive various kinds of information.

The sensors 7 can be arranged at any position in/on the host vehicle 3 from where detection of a vehicle surrounding is possible, such as at a bumper, a windscreen, a rear mirror, a grille etc. In the embodiment illustrated in FIG. 1 one forward-directed sensor 7a and two rearward-directed sensors 7b, 7c are illustrated. In other embodiment and/or situations the sensors 7 can be arranged differently.

The at least one sensor 7 is arranged to determine whether a vehicle 9a, 9b is present in a detectable zone 11a, 11b, 11c of a second road lane 5a, 5c adjacent to the first road lane 5b. The at least one sensor 7 can also detect objects in other parts of the host vehicle surrounding, such as a preceding vehicle 9c in the first lane 5b. In the FIG. 1 embodiment three detectable zones 11a, 11b, and 11c are illustrated in the host vehicle surrounding. The situation in FIG. 1 is only illustrative; the range of the detectable zones 11a, 11b, and 11c can vary dependent on e.g. type of sensor 7 and where on the host vehicle 3 the sensor 7 is arranged.

The host vehicle 3 further comprises a vehicle drive arrangement 13 which is arranged to control at least one of steering and velocity of the host vehicle 3. The drive arrangement 13 is connected to a vehicle steering system, such that the drive arrangement 13, directly or indirectly, can control a direction of at least some of the wheels of the host vehicle 3. Hereby e.g. a yaw rate of the host vehicle 3 can be adjusted, such that the driving direction of the host vehicle 3 is adjusted in accordance with the input from the drive arrangement 13. The drive arrangement 13 is also connected to a host vehicle engine and a host vehicle braking system, such that the drive arrangement 13, directly or indirectly, can control acceleration and/or deceleration of the host vehicle 3. The drive arrangement 13 can e.g. increase a host vehicle velocity by increasing the engine speed, and decrease the host vehicle velocity by motor-braking or by activation of one or more wheel brakes. The drive arrangement 13 may e.g. be connected to an ABS (anti-lock braking system), such that one or more wheel brakes can be activated selectively.

In some embodiments the host vehicle 3 comprises a navigation system, to which a user can input a preferred host vehicle route. The navigation system can comprise a positioning system, which may determine a host vehicle position and heading. The positioning system can determine the host vehicle position and driving direction e.g. via a satellite based global positioning system or via map matching and a compass.

In some embodiments the drive arrangement 13 comprises, or is connected to, a number of vehicle subsystems. Each such subsystem may provide some automatic- or semi-autonomous drive functions. Examples of such subsystem are: adaptive cruise control systems, lane departure control systems, collision avoidance systems, traffic sign recognition systems, some communication systems, some navigation systems, ultrasonic sensor systems, infrared camera systems, inertial measuring systems, intelligent transportation systems, safe road train systems, automatic parking systems etc. The host vehicle 3 and/or the lane change control arrangement 1 can also comprise or be connected to a processing unit and/or to any control arrangements of the host vehicle 3. In some embodiments the one or more processing units are used for processing in several different vehicle systems.

The lane change control arrangement 1 is arranged to adjust, via the vehicle drive arrangement 13, the host vehicle velocity in accordance with a first velocity profile to expand the detectable zone 11a, 11b, 11c to cover a previously undetectable zone 15a of the second road lane 5a. The first velocity profile is further discussed in conjunction with FIG. 2 and FIG. 3.

In FIG. 1 three undetectable zones 15a, 15b, 15c are illustrated. In the FIG. 1 situation only zone 15a is coinciding with the adjacent second road lane 5a. In an embodiment or situation where a lane change from the first lane 5b to the second lane 5c potentially occurs, previously undetectable zone 15c is coinciding with the adjacent road lane 5c.

After adjustment of the host vehicle velocity in accordance with the first velocity profile the lane change control arrangement 1 is arranged to detect, via the at least one sensor 7, whether a vehicle 9d is present in the previously undetectable zone 15a.

If no vehicle is present in the previously undetectable zone 15a the lane change control arrangement 1 will determine that a lane change is possible using the second road lane 5a. Then, the host vehicle 1 can change lane from first lane 5b to second lane 5a, for example in order to overtake or pass the preceding vehicle 9c.

If a vehicle 9d is present in the previously undetectable zone 15a the lane change control arrangement 1 can determine not to change lane. Such a lane change can e.g. be determined to be unsuitable, impossible or hazardous using the second road lane 5a. The lane change control arrangement 1 will then issue a control signal to the vehicle drive arrangement 13 to adjust the host vehicle velocity in accordance with a second velocity profile until a safety distance is established between the host vehicle 3 and the detected vehicle 9d. The safety distance can be a predetermined distance between the host vehicle 3 and the detected vehicle 9d or can be a predetermined time gap between the vehicles. Such time gap can be selected e.g. in dependence of a current host vehicle velocity.

The second velocity profile can, e.g. depending on where the host vehicle 3 is located relatively the vehicle 9d, include acceleration and/or deceleration of the host vehicle 3. For example, if the second velocity profile includes acceleration, the host vehicle 3 can be accelerated relatively the vehicle 9d such that a lane change to the second lane 5a can be performed to a position ahead of the vehicle 9d. If the second velocity profile includes deceleration, the host vehicle 3 can be braked relatively the vehicle 9d such that a lane change to the second lane 5a can be performed to a position behind the vehicle 9d.

When the velocity of the host vehicle 3 has been adjusted in accordance with the second velocity profile the lane change control arrangement 1 will issue a control signal to the vehicle drive arrangement 13 to perform the lane change from the first lane 5b to the second lane 5a.

The above situation can of course be reversed, e.g. when the host vehicle 3 has passed the preceding vehicle 9c in second lane 5a and is about to return to the first lane 5b.

The undetectable zones 15a, 15b, 15c is thus some sectors or fields around the host vehicle where the sensors have decreased functionality and therefore have difficulties or are unable to detect objects. A surrounding vehicle which drives with approximately the same velocity as the host vehicle can stay undetected for some time since the host vehicle and the surrounding vehicle both are driving along the road 5 but are relatively stationary relatively each other. When the velocity of the host vehicle is adjusted in accordance with the first velocity profile it is unlikely that the surrounding vehicle will initiate a similar change of velocity. The relative position between the host vehicle and the surrounding vehicle will therefore be changed until the surrounding vehicle no longer is in the undetectable zone and therefore can be detected by sensors and/or a driver.

In some embodiments a surrounding vehicle which overtakes the host vehicle may first pass a first detectable zone, then pass an undetectable zone and then enter a second detectable zone. In such situation it can be concluded that no other vehicle is present in the undetectable zone. The lane change control arrangement can control whether to change lane or not also based on this information.

It should be noted that the lane change control arrangement 1 described herein may refer to and/or comprise a combination of analog and digital circuits and/or one or more processors and memory configured with software and/or firmware, e.g., stored in the memory, that when executed by the one or more processors perform the functions and/or operations described herein. One or more of such processors, as well as other digital hardware, may be included in a single ASIC (Application-Specific Integrated Circuitry), or several processors and various digital hardware may be distributed among several separate components, whether individually packaged or assembled into a SoC (System-on-a-Chip).

Figure 2:
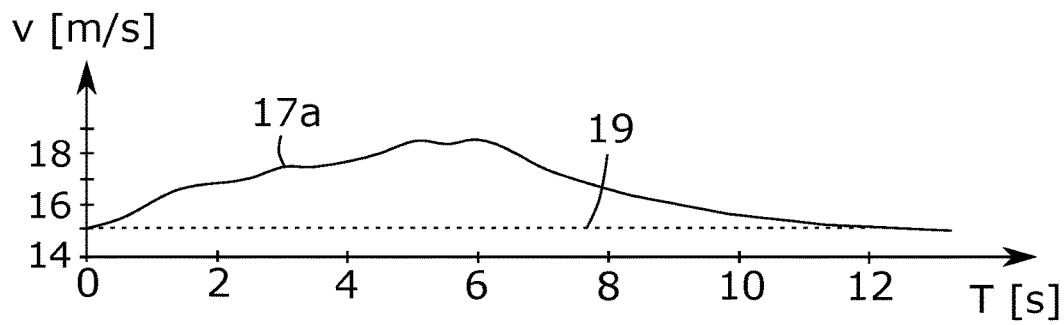
FIG. 2 illustrates a first velocity profile according to some embodiments.
Figure 3:
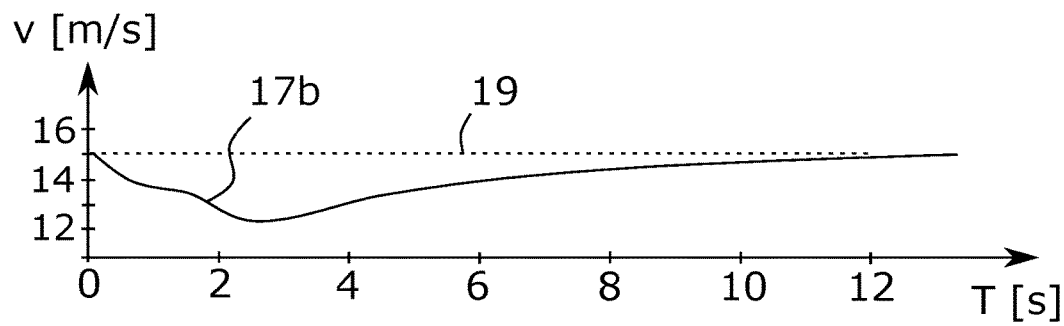
FIG. 3 illustrates the first velocity profile according to some other embodiments.

FIG. 2 and FIG. 3 illustrate some examples of first velocity profiles 17a, 17b which can be used by the lane change control arrangement for adjustment of the he host vehicle velocity to expand the detectable zone in order to cover a previously undetectable zone of the second road lane illustrated in FIG. 1.

Initially, at T=0, the host vehicle in FIG. 2 drives with an initial velocity 19 of about 15 m/s in both FIG. 2 and FIG. 3. In other embodiments or examples the initial velocity of course can be higher or lower.

When the host vehicle starts to follow the first velocity profile 17a in FIG. 2 the host vehicle will accelerate. In the FIG. 2 embodiment the host vehicle velocity is ramped up the over a time duration of at least about 5-6 seconds. In some embodiments the time duration can be shorter or longer. The first velocity profile 17a is selected and/or generated such that it is highly unlikely that a vehicle in an undetectable zone of the host vehicle will follow a similar first velocity profile and thereby continue to drive in the undetectable zone when the host vehicle follows the first velocity profile 17a.

When the host vehicle starts to follow the first velocity profile 17b in FIG. 3 the host vehicle will decelerate or brake. In the FIG. 3 embodiment the host vehicle velocity is ramped down the over a time duration of at least two seconds. In some embodiments the time duration can be shorter or longer. The first velocity profile 17b is selected and/or generated such that it is highly unlikely that a vehicle in an undetectable zone of the host vehicle will follow a similar first velocity profile 17b and thereby continue to drive in the undetectable zone when the host vehicle follows the first velocity profile 17b. In some embodiments the host vehicle velocity is alternately ramped up and down over a time duration of e.g. 1-12 seconds. If a vehicle in an adjacent lane is detected the first velocity profile may be updated.

In some embodiments the lane change control arrangement is arranged to select and retrieve the first velocity profile among a plurality of saved velocity profiles. The selection can be based on the host vehicle velocity. In some embodiments the selection is based on the host vehicle velocity or a detected vehicle velocity of a vehicle in the second road lane. In some embodiments the lane change control arrangement is arranged to generate the first velocity profile. The generation can be based on the host vehicle velocity or a detected vehicle velocity of a vehicle in the second road lane. The host vehicle can, via communication equipment of the host vehicle, be connected to databases and/or online servers such that information on such databases and/or online servers can be used for the selection and/or generation of first velocity profiles.

The first velocity profiles in FIG. 2 and FIG. 3 are some illustrative examples; the first velocity profiles can have any suitable form. The first velocity profiles 17a, 17b can be selected and/or generated e.g. with due care to aspects like safety, safety distances to objects and vehicles near the host vehicle, vehicle occupant comfort, host vehicle accelerating-, braking- and/or stability performance of the host vehicle and other aspects.

Figure 4:
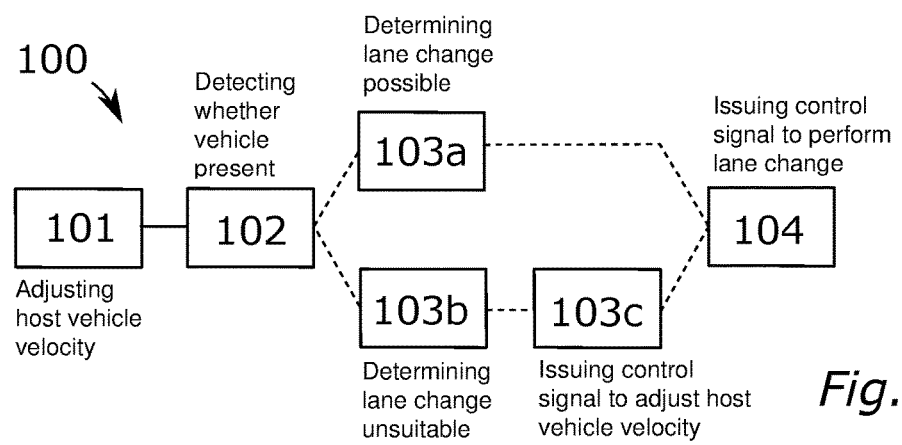
FIG. 4 illustrates a method for controlling lane changes.

FIG. 4 illustrates a method 100 for controlling lane changes for a vehicle comprising a lane change control arrangement. The lane change control arrangement is arranged to control lane changes for the host vehicle in a situation where the host vehicle drives in a first road lane of a road having two or more lanes. The host vehicle comprises at least one remote sensor, arranged to determine whether a vehicle is present in a detectable zone of a second road lane adjacent to the first road lane and a vehicle drive arrangement which is arranged to control at least one of steering and velocity of the host vehicle.

The method 100 comprises: Adjusting 101, via the vehicle drive arrangement, the host vehicle velocity in accordance with a first velocity profile to expand the detectable zone to cover a previously undetectable zone of the second road lane. Detecting 102, via the at least one sensor, whether a vehicle is present in the previously undetectable zone.

Determining 103a that a lane change is possible using the second road lane upon having detected that no vehicle is present in the previously undetectable zone, or determining 103b that a lane change is unsuitable using the second road lane upon having detected that a vehicle is present in the previously undetectable zone and issuing 103c a control signal to the vehicle drive arrangement to adjust the host vehicle velocity in accordance with a second velocity profile until a safety distance is established between the host vehicle and the detected vehicle. Issuing 104 a control signal to the vehicle drive arrangement to perform the lane change.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A lane change control arrangement for controlling lane changes for a host vehicle when the host vehicle drives in a first road lane of a road having two or more lanes, wherein the host vehicle includes at least one remote sensor arranged to determine whether a vehicle is present in a detectable zone of a second road lane adjacent to the first road lane, and a vehicle drive arrangement arranged to control at least one of steering and velocity of the host vehicle, the lane change control arrangement operable to:
    adjust, via the vehicle drive arrangement, the host vehicle velocity in accordance with a first velocity profile to expand the detectable zone to cover a previously undetectable zone of the second road lane;
    detect, via the at least one sensor, whether a vehicle is present in the previously undetectable zone;
    determine that a lane change
        is possible using the second road lane upon having detected that no vehicle is present in the previously undetectable zone, or
        is unsuitable using the second road lane upon having detected that a vehicle is present in the previously undetectable zone and issue a control signal to the vehicle drive arrangement to adjust the host vehicle velocity in accordance with a second velocity profile until a safety distance is established between the host vehicle and the detected vehicle; and
    issue a control signal to the vehicle drive arrangement to perform the lane change.

2. The arrangement according to claim 1 further arranged to simulate that a fictive vehicle drives with a fictive vehicle velocity in the undetectable zone of the second road lane and select the first velocity profile in dependence of the fictive vehicle velocity.

3. The arrangement according to claim 1 further arranged to issue a control signal to the vehicle drive arrangement to perform the lane change from the first lane to a position ahead or behind a detected vehicle in the previously undetectable zone where such vehicle is detected.

4. The arrangement according claim 1 further arranged to select and retrieve the first velocity profile among a plurality of saved velocity profiles, and where the selection is based on the host vehicle velocity.

5. The arrangement according to claim 1 further arranged to select and retrieve the second velocity profile among a plurality of saved velocity profiles, and where the selection is based on the host vehicle velocity or a, by the at least one remote sensor, detected vehicle velocity of a vehicle in the second road lane.

6. The arrangement according to claim 1 further arranged to generate the first velocity profile, where the generation is based on the host vehicle velocity or a, by the at least one remote sensor, detected vehicle velocity of a vehicle in the second road lane.

7. The arrangement according to claim 1 wherein the first velocity profile comprises ramping up the host vehicle velocity over a time duration of at least one second.

8. The arrangement according to claim 1 wherein the first velocity profile comprises ramping down the host vehicle velocity over a time duration of at least one second.

9. The arrangement according to claim 1 wherein the first velocity profile comprises alternately ramping up and down the host vehicle velocity over a time duration of at least one second.

10. A vehicle comprising a lane change control arrangement for controlling lane changes for the vehicle when the vehicle drives in a first road lane of a road having two or more lanes, wherein the vehicle includes at least one remote sensor arranged to determine whether another vehicle is present in a detectable zone of a second road lane adjacent to the first road lane, and a vehicle drive arrangement arranged to control at least one of steering and velocity of the vehicle, the lane change control arrangement operable to:
    adjust, via the vehicle drive arrangement, the vehicle velocity in accordance with a first velocity profile to expand the detectable zone to cover a previously undetectable zone of the second road lane;
    detect, via the at least one sensor, whether another vehicle is present in the previously undetectable zone;
    determine that a lane change
        is possible using the second road lane upon having detected that another vehicle is not present in the previously undetectable zone, or
        is unsuitable using the second road lane upon having detected that another vehicle is present in the previously undetectable zone and issue a control signal to the vehicle drive arrangement to adjust the vehicle velocity in accordance with a second velocity profile until a safety distance is established between the vehicle and the detected another vehicle; and
    issue a control signal to the vehicle drive arrangement to perform the lane change.

11. A method for controlling lane changes of a host vehicle having a lane change control arrangement arranged to control lane changes for the host vehicle when the host vehicle drives in a first road lane of a road having two or more lanes, wherein the host vehicle includes at least one remote sensor arranged to determine whether a vehicle is present in a detectable zone of a second road lane adjacent to the first road lane, and a vehicle drive arrangement arranged to control at least one of steering and velocity of the host vehicle, the method comprising:
    adjusting, via the vehicle drive arrangement, the host vehicle velocity in accordance with a first velocity profile to expand the detectable zone to cover a previously undetectable zone of the second road lane;

detecting, via the at least one sensor, whether a vehicle is
   present in the previously undetectable zone,
determining that a lane change
   is possible using the second road lane upon having
      detected that no vehicle is present in the previously
      undetectable zone, or
   is unsuitable using the second road lane upon having
      detected that a vehicle is present in the previously
      undetectable zone and issuing a control signal to the
      vehicle drive arrangement to adjust the host vehicle
      velocity in accordance with a second velocity profile
      until a safety distance is established between the host
      vehicle and the detected vehicle; and
issuing a control signal to the vehicle drive arrangement
   to perform the lane change.

* * * * *